(12) United States Patent
Shimizu et al.

(10) Patent No.: US 6,440,511 B1
(45) Date of Patent: *Aug. 27, 2002

(54) THERMOPLASTIC RESIN LAMINATE

(75) Inventors: Tetsuo Shimizu; Hirofumi Nishibayashi; Takeshi Inaba; Yoshihisa Yamamoto; Takafumi Yamato; Masakatsu Kitano, all of Settsu (JP)

(73) Assignee: Daikin Industries, Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,484

(22) PCT Filed: Mar. 15, 1996

(86) PCT No.: PCT/JP96/00662
§ 371 (c)(1),
(2), (4) Date: Sep. 17, 1997

(87) PCT Pub. No.: WO96/29200
PCT Pub. Date: Sep. 26, 1996

(30) Foreign Application Priority Data

Mar. 17, 1995  (JP) .............................. 7-059111

(51) Int. Cl.$^7$ ...................... B29C 47/06; B32B 7/00; B32B 27/08
(52) U.S. Cl. ..................... 428/36.9; 428/420; 428/421; 525/199; 525/200
(58) Field of Search ............................... 428/35.2, 35.7, 428/36.9, 421, 422, 474.4, 475.5, 475.8, 476.1, 476.3, 476.9, 420, 480, 483; 525/199, 200

(56) References Cited

U.S. PATENT DOCUMENTS 4,886,689 A  *  12/1989  Kotliar et al. ............. 428/35.7
5,441,782 A  *  8/1995  Kawashima et al. ....... 428/36.9
5,716,684 A  *  2/1998  Stoeppelmann et al. . 428/36.91

FOREIGN PATENT DOCUMENTS

| EP | 0523644 A1 | 1/1993 |
| EP | 0642921 A1 | 3/1995 |
| JP | 62 58615 | 12/1987 |
| JP | 63-275644 A  * | 11/1988 |
| JP | 4 224939 | 8/1992 |
| JP | 5 60422 | 9/1993 |
| JP | 7 164602 | 6/1995 |
| JP | 7 173447 | 7/1995 |

OTHER PUBLICATIONS

Japanese Publication No. 63–275644 A; published Nov. 14, 1988—Abstract Only.

* cited by examiner

*Primary Examiner*—Harold Pyon
*Assistant Examiner*—Sandra M. Nolan
(74) *Attorney, Agent, or Firm*—Birch, Stewart, Kolasch & Birch, LLP

(57) ABSTRACT

In a thermoplastic resin laminate having at least three thermoplastic resin layers, wherein an intermediate layer interposed between a first layer of a thermoplastic resin A1 and a second layer of a thermoplastic resin B1, which are not bonded each other, is a thermoplastic resin composition which contains as a main component a thermoplastic resin A2 having a bonding property to the thermoplastic resin A1 and a thermoplastic resin B2 having a bonding property to the thermoplastic resin B1 and forms a dispersion structure, wherein the thermoplastic resin A2 forms a continuous phase and the thermoplastic resin B2 forms a dispersed phase in the intermediate layer at the vicinity of the interface between the intermediate layer and the first layer, and wherein the thermoplastic resin B2 forms the continuous phase and the thermoplastic resin A2 forms the dispersed phase in the intermediate layer at the vicinity of the interface between the intermediate layer and the second layer, the first layer and the second layer are firmly bonded by the intermediate layer.

3 Claims, 2 Drawing Sheets

THERMOPLASTIC RESIN LAMINATE

FIELD OF THE INVENTION

The present invention relates to a thermoplastic resin laminate produced by firmly bonding two layers composed respectively of different types of thermoplastic resins which are not bonded each other.

RELATED ART

As a conventional laminating method of bonding two layers composed respectively of a thermoplastic resin A and a thermoplastic resin B, which are not. bonded each other, for example, a method of chemically modifying the surface and a method of physically modifying the surface by means of sputtering, corona discharge, plasma, excimer laser, etc. are known. These methods had a problem that an interlaminar bonding force is small although a special processing device is required. Furthermore, in order to obtain a resin laminate, a successive melt molding is required and therefore the number of steps at the time of molding increases, which results in poor processing productivity.

Even if a simultaneous co-extrusion method is used, it was limited to a co-extrusion method using a thermoplastic resin C which is bonded to both thermoplastic resin A and thermoplastic resin B.

SUMMARY OF THE INVENTION

The present invention provides a thermoplastic resin laminate comprising at least three thermoplastic resin layers, wherein an intermediate layer interposed between a first layer comprising a thermoplastic resin A1 and a second layer comprising a thermoplastic resin B1, which are not bonded each other, comprises a thermoplastic resin composition which comprises as a main component a thermoplastic resin A2 having a bonding property to the thermoplastic resin A1 and a thermoplastic resin B2 having a bonding property to the thermoplastic resin B1 and forms a dispersion structure, wherein the thermoplastic resin A2 forms a continuous phase and the thermoplastic resin B2 forms a dispersed phase in the intermediate layer at the vicinity of the interface between the intermediate layer and the first layer, and wherein the thermoplastic resin B2 forms the continuous phase and the thermoplastic resin A2 forms the dispersed phase in the intermediate layer at the vicinity of the interface between the intermediate layer and the second layer.

According to the present invention, a firm bonding strength can be accomplished between the first layer of the thermoplastic resin A1 and the second layer of the thermoplastic resin B1.

DETAILED DESCRIPTION OF THE INVENTION

Figure 1:
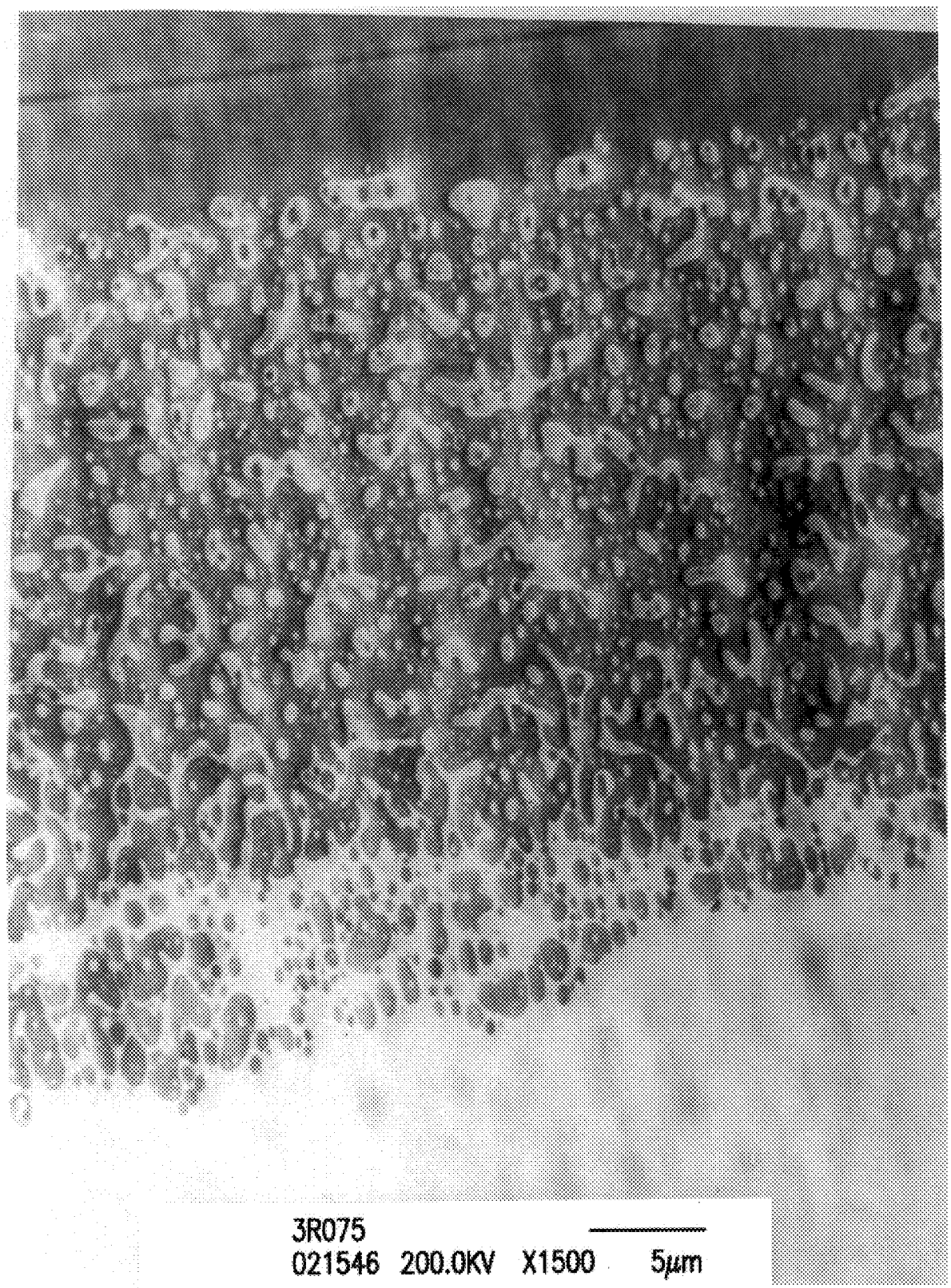
FIG. 1 is a transmission electron micrograph of a cross section of the tube obtained in Example 1.

The laminate of the present invention comprises (1) a first layer comprising a thermoplastic resin A1, (2) a second layer comprising a thermoplastic resin B1 and (3) an intermediate layer which is located between these layers and is bonded to both layers.

The thermoplastic resin A1 may be any one wherein the thermoplastic resin A1 and thermoplastic resin B1 are not bonded each other, but is preferably a fluororesin having various good features such as heat resistance, oil resistance, chemical resistance, frictional wear characteristics, tack-free property and the like.

The thermoplastic resin B1 may be any one wherein the thermoplastic resin A1 and thermoplastic resin B1 are not bonded each other, but is preferably a polyamide or polyester resin (e.g. polybutylene terephthalate (PBT), etc.) having high strength, high toughness, lightweight property and excellent processability. Among them, a polyamide resin having a flexibility (e.g. PA11, PA12, PA610) is particularly preferred because it is possible to make use of characteristics such as oil resistance, chemical resistance, etc. with minimizing the amount of a comparatively expensive fluororesin when the fluororesin is used as the thermoplastic resin A1.

The intermediate layer is formed of a thermoplastic resin composition comprising the thermoplastic resin A2 and the thermoplastic resin B2 as a main component. A thickness of the intermediate layer is at least 0.01 mm, e.g. 0.01 to 10 mm, preferably from 0.03 to 0.5 mm.

The thermoplastic resin A2 may be any one wherein the thermoplastic resin A2 and thermoplastic resin A1 are bonded each other. When a fluororesin is used as the thermoplastic resin A1, the thermoplastic resin A2 is preferably the same type of the fluororesin. The thermoplastic resin B2 may be any one wherein the thermoplastic resin B2 and thermoplastic resin B1 are bonded each other. When a polyamide resin is used as the thermoplastic resin B1, the thermoplastic resin B2 is preferably the same type of the polyamide resin. When a polyester resin is used as the thermoplastic resin B1, the thermoplastic resin B2 is preferably the same type of the polyester resin.

The fluororesin used as the thermoplastic resin A1 or thermoplastic resin A2 may be any fluororesin which can be subjected to hot-melt processing. Specific examples of the fluororesin include tetrafluoroethylene/fluoro(alkyl vinyl ether) copolymer (hereinafter referred to as "PFA"), tetrafluoroethylene/hexafluoropropylene copolymer (hereinafter referred to as "FEP"), ethylene/tetrafluoroethylene copolymer (hereinafter referred to as "ETFE"), polyvinylidene fluoride (hereinafter referred to as "PVDF"), polychlorotrifluoroethylene (hereinafter referred to as "PCTFE"), ethylene/chlorotrifluoroethylene copolymer (hereinafter referred to as "ECTFE") and the like. An average molecular weight of the fluororesin may normally be from 2,000 to 1,000,000.

PFA is preferably a copolymer of tetrafluoroethylene and at least one fluoro(alkyl vinyl ether) represented by the formula: $CF_2=CF-O-Rf$ (Rf is a fluoroalkyl group having 1 to 10 carbon atoms). PFA preferably comprises 99 to 92% by weight of tetrafluoroethylene and 1 to 8% by weight of fluoro(alkyl vinyl ether).

FEP preferably comprises 96 to 87% by weight of tetrafluoroethylene and 4 to 13% by weight of hexafluoropropylene.

ETFE preferably comprises 90 to 74% by weight of tetrafluoroethylene and 10 to 26% by weight of ethylene.

ECTFE preferably comprises 68 to 14% by weight of ethylene and 32 to 86% by weight of chlorotrifluoroethylene.

The fluororesin may contains one or more other monomers unless essential characteristics are not deteriorated. Examples of the other monomer include tetra-fluoroethylene (provided PFA, FEP and ETFE are excluded), hexafluoropropylene (provided FEP is excluded), fluoro(alkyl vinyl ether) (provided PFA is excluded), vinylidene fluoride (provided PVDF is excluded), chlorotrifluoroethylene (provided PCTFE is excluded), perfluoroalkyl($C_{1-10}$) ethylene, perfluoroalkyl($C_{1-10}$)allylether and a compound represented by the formula:

$$CF_2=CF[OCF_2CFX(CF_2)_m]_nOCF_2(CF_2)_pY$$

wherein X is fluorine or a trifluoromethyl group; Y is halogen; m is a number of 0 or 1 (provided X is limited to fluorine when m is 1); n is a number of 0 to 5; and p is a number of 0 to 2. An amount of the other monomer in the polymer is at most 20% by mol based on the polymer.

Among these fluororesins, a vinylidene fluoride copolymer or ethylene/fluorine-containing olefin copolymer having comparatively low melting point is preferred.

The vinylidene fluoride copolymer means polyvinylidene fluoride (PVDF), and a resinous copolymer comprising vinylidene fluoride (VDF) and at least one fluorine-containing monomer which can be copolymerized with vinylidene fluoride. Typical examples of the fluorine-containing monomer which can be copolymerized with vinylidene fluoride include tetrafluoroethylene (TFE), hexafluoropropylene (HFP), chlorotrifluoroethylene (CTFE), hexafluoroisobutylene, hexafluoroacetone, pentafluoropropylene, trifluoroethylene, vinyl fluoride, fluoro(alkyl vinyl ether) and the like. In the vinylidene fluoride copolymer, an amount of vinylidene fluoride is at least 35% by mol based on the copolymer.

The ethylene/fluorine-containing olefin copolymer is a resinous copolymer wherein a molar ratio of ethylene/(TFE and/or CTFE) is from 10/90 to 60/40, and contains a third fluorine-containing monomer which can be copolymerized with them in an amount of 0 to 15% by mol based on the total amount of ethylene and TFE and/or CTFE. Examples of the third fluorine-containing monomer include at least one compound represented by $CH_2=CZ(CF_2)_wZ$, $CF_2=CZ(CF_2)_wZ$, $CF_2=CFO(CF_2)_wZ$ (Z is a hydrogen atom or a fluorine atom; and w is an integer of 1 to 8) or $CH_2=C(CF_3)_2$.

Among these vinylidene fluoride copolymers or ethylene/fluorine-containing olefin copolymers, a vinylidene fluoride copolymer and/or ethylene/fluorine-containing olefin copolymer having a melt viscosity of 10 to 100,000 poise at 250° C. under a shear rate of 100 $sec^{-1}$ can be selected so as to obtain sufficient melt fluidity within the kneading/molding temperature range without accompanying drastic deterioration of a polyamide resin when the copolymer is co-extruded together with the polyamide resin.

Among them, a copolymer, which is superior in flexibility, low-temperature impact resistance, heat resistance, etc. with maintaining low fuel permeability and is optimum for producing a fuel pipe or tube by means of simultaneous multilayer extrusion with the polyamide resin, is an ethylenelfluorine-containing olefin copolymer having a melt viscosity of 10 to 100,000 poise at 250° C. under a shear rate of 100 $sec^{-1}$. Since the amount of the comparatively high-cost third fluorine-containing monomer can be reduced without deteriorating characteristics of the ethylene/fluorine-containing olefin copolymer, an ethylene/teterafluoroethylene copolymer wherein a molar ratio of ethylene/TFE is from 10/90 to 38/62 and a third fluorine-containing monomer copolymerizable with them is contained in an amount of about 0.1 to 5% by mol based on the total weight of ethylene and TFE (Japanese Patent Kokoku Publication No. 58615/1987) can be optimum.

The polyamide resin used as the thermoplastic resin B1 or thermoplastic resin B2 may be any known aliphatic or aromatic polyamide resin, and it is possible to appropriately select from a polymer of lactam, a condensate of diamine and dicarboxylic acid, a polymer of amino acid, and copolymers or blends thereof.

Specific examples of the polyamide resin include polyamide 6, 66, 46, 11, 12, 610, 612 and the like. For the purpose of improving the flexibility, a plasticizer component may be formulated to the polyamide resin. It is also possible to use a polyamide thermoplastic elastomer such as polyetheresteramide. An average molecular weight of the polyamide resin is normally from 5,000 to 500,000.

Among these polyamide resins, preferred are polyamide 11, 12 and 610 because of their characteristics required as a tube, hose or pipe material in which the thermoplastic resin laminate of the present invention is mainly used.

It is preferred to use the same type of polyamide resins in the thermoplastic resins B1 and B2 in view of bonding property and co-extrusion property. Furthermore, it is preferred to select a polyamide resin having a melt viscosity of 10 to 100,000 poise at 250° C. under a shear rate of 100 $sec^{-1}$ in view of adjustment of the melt viscosity of the composition.

The respective layers in the present invention may contain inorganic or organic fillers which are normally used, such as a fibrous reinforcer (e.g. glass fiber, carbon fiber, ceramic fiber, potassium titanate fiber, aramid fiber, aromatic polyester fiber, etc.), an inorganic filler (e.g. calcium carbonate, talc, mica, clay, carbon powder, graphite, glass beads, etc.), metal powder, polyolefin powder, polytetrafluoroethylene powder, a heat-resistant resin (e.g. polyimide, etc.), a colorant, a flame retardant and a sliding additive. An amount of the fillers is normally from 1 to 70 parts by weight based on 100 parts by weight of the resin.

It is possible to invert the dispersion structure of the intermediate layer in the vicinity of the Interface between the intermediate layer and the first layer and in the vicinity of the interface between the intermediate layer and the second layer by adjusting (1) a composition ratio of constituent components, (2) a viscosity ratio of constituent components and (3) co-extrusion conditions (e.g. a preset temperature, an extrusion amount, a take-off rate, a die structure, a screw structure, etc.). For example, the co-extrusion conditions may be adjusted so that a difference in temperature and/or a difference in shear rate are formed in the intermediate layer between the vicinity of the interface near the first layer and the vicinity of the interface near the second layer, in the die in case of co-extrusion. For example, the difference in temperature may be within the range from 1 to 150° C., preferably from 10 to 100° C.

In the thermoplastic resin laminate of the present invention, it is preferred that the thermoplastic resin A1 and thermoplastic resin A2 are ethylene/fluorine-containing olefin copolymers, particularly ETFE, and the thermoplastic resin B1 and thermoplastic resin B2 are polyamide resins, particularly polyamide 12.

It is preferred that the melt viscosity of ETFE is from $10^3$ to $10^6$ poise (when the temperature is 285° C. and the shear rate is $10^2$ $sec^{-1}$), the melt viscosity of PA12 is from $10^1$ to $10^4$ poise (when the temperature is 245° C. and the shear rate is $10^2$ $sec^{-1}$), and the weight ratio of (PA12)/(ETFE) is from 1/9 to 3/2.

Under the condition that the resin temperature is from 230 to 310° C. and the shear rate is from 0 to $10^4$ $sec^{-1}$ at the time of simultaneous co-extrusion in the intermediate layer at the vicinity of the interface between the intermediate layer and the first layer, ETFE forms a continuous phase and PA12 forms a dispersed phase. Under the condition that the resin temperature is from 200 to 260° C. and the shear rate is from 0 to $10^4$ $sec^{-1}$ at the time of simultaneous co-extrusion in the intermediate layer at the vicinity of the interface between the intermediate layer and the second layer, PA12 forms a continuous phase and ETFE forms a dispersed phase. Consequently, a firm bonding strength is obtained between the first and second layers. Each continuous phase is formed in the intermediate layer at the vicinity of the interface with the first and second layers. With respect to the center portion of the intermediate layer, any one of them may be a continuous phase.

In order to enhance the mixing dispersion property with the thermoplastic resin A2 or thermoplastic resin B2 and to improve the interlaminar bonding property in case of laminating with the first layer and/or second layer, there may be mixed a rubber (e.g. fluororubber, etc.), a plasticizer (e.g. N-butylbenzenesulfonamide, N-ethyltoluenesulfonamide, N-cyclohexyltoluenesulfonamide, octylcresol, 2-ethyl-p-hydroxybenzoate, p-oxybenzoate, etc.) or a block or graft copolymer comprising polymeric components having an affinity for each of the first and second layers (e.g. block or graft copolymer comprising a polymeric component containing a monomer having an epoxy group or a carboxylic (anhydride) group and a (meth)acrylic polymer component) in an amount of 1 to 30 parts by weight based on the total weight (100 parts by weight) of the thermoplastic resin A2 and thermoplastic resin B2 in the present invention. A molecular weight of the polymeric component containing a monomer having an epoxy group or a carboxylic (anhydride) group is from 1,000 to 200,000, that of the (meth)acrylic polymeric component is from 1,000 to 200,000 and that of the block or graft copolymer is from 2,000 to 400,000. A proportion of the monomer having an epoxy resin or a carboxylic (anhydride) group in the block or graft copolymer is from 1 to 30% by weight. By using the rubber, the plasticizer, or the block copolymer or graft copolymer, the low-temperature impact resistance, interlaminar bonding property and flexibility of the laminate can be enhanced.

It is also possible to supplement the interlaminar bonding property by providing two or more intermediate layers.

As the simultaneous co-extrusion molding in the present invention, there can be used molding methods such as a multilayer co-extrusion molding, a multilayer blow molding, a multilayer injection molding and the like.

In the preparation of the thermoplastic resin composition which forms the intermediate layer, a known mixing method is normally used. For example, pellets can be prepared by previously mixing the respective components with a mixer such as a V-type blender, a tumbler, a Henschel mixer, etc., followed by mixing in a melt mixing device such as twin-screw extruder, etc.

For the purpose of reinforcing, antistaining or destaticizing the outside or inside of the laminate of the present invention, a resin layer or a rubber layer can also be provided during or after simultaneous co-extrusion.

Examples of the shape of the thermoplastic resin laminate of the present invention include a hose, a pipe, a tube, a sheet, a seal, a gasket, a packing, a film, a tank, a roller, a bottle, a container, etc., and any shape can be obtained by means of a multilayer co-extrusion molding, a multilayer blow molding, a multilayer injection molding, etc. The thermoplastic resin laminate of the present invention is used for a sour gasoline, for an alcohol fuel, for a fuel containing a gasoline additive (e.g. methyl tert-butyl ether (MTBE), amine, etc.), for an ink/paint, for transporting a waste liquid, for transporting a high-temperature liquid, and for a steam piping.

When the laminate is a tube and the first layer is a fluororesin, the first layer is preferably an innermost layer.

PREFERRED EMBODIMENT OF THE INVENTION

The present invention will be illustrated by the following Examples which do not limit the present invention.

An interlaminar bonding strength was determined by subjecting a test piece having a width of 10 mm, obtained by cutting a tube, to a 180° peeling test at room temperature at a separation rate of 50 mm/min.

EXAMPLES 1 TO 4

Comparative Examples 1 to 3

By a multi-manifold die, pellets obtained by kneading in a twin-screw extruder were simultaneously extruded (coextrusion of three layers) at an extrusion rate of 10 m/min under the conditions shown in Table 1 to form a multi-layer tube.

TABLE 1

| Molding conditions | | | |
| --- | --- | --- | --- |
| | Inner layer | Intermediate layer | Outer layer |
| | ETFE | Bonding layer | PA12 |
| Cylinder preset temperature (° C.) | 260–310 | 200–240 | 220–250 |
| Die preset temperature (° C.) | 230–250 | 230–250 | 230–250 |
| Resin temperature (° C.)[1)] | 280–310 | 200–240 | 235 |

Note
[1)]Resin temperature at connection portion of cylinder and die

The multi-layer tube was composed of an inner layer, an intermediate layer and an outer layer, in which an outer diameter of the tube was 8 mm, an inner diameter of the tube was 6 mm, a thickness of the inner layer was 0.2 mm, a thickness of the intermediate layer was 0.1 mm and a thickness of the outer layer was 0.7 mm. The interlaminar bonding strength of the tube was measured. The results are shown in Table 2.

Figure 2:
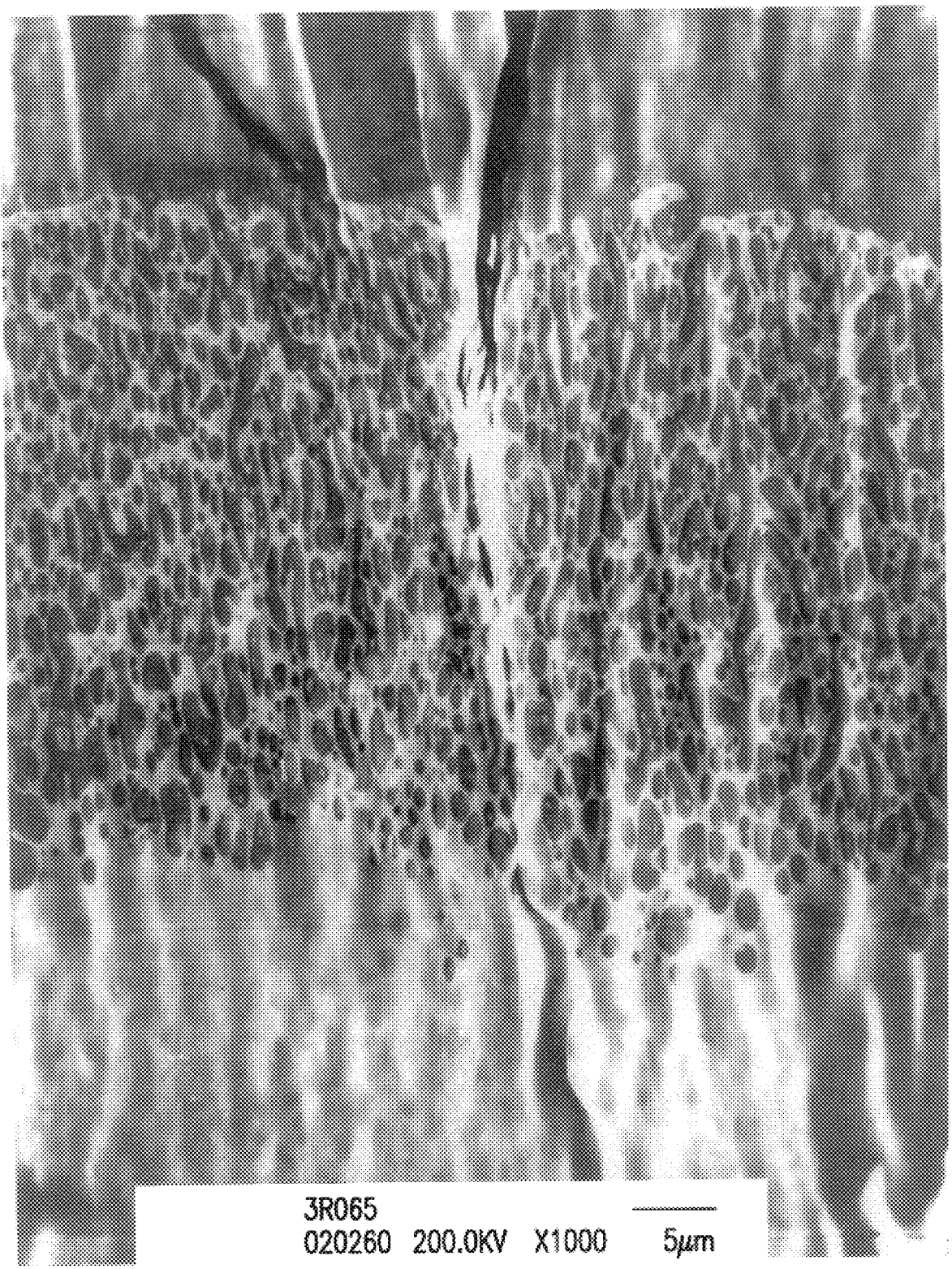
FIG. 2 is a transmission electron micrograph of a cross section of the tube obtained in Comparative Example 1.

A transmission electron micrograph (TEM) of a cross section of the tube obtained in Example 1 is shown in FIG. 1 and that of the tube obtained in Comparative Example 1 is shown in FIG. 2.

Comparative Example 4

After a single-layer tube of ETFE having an Inner diameter of 6 mm and a layer thickness of 0.3 mm was extruded, the surface was subjected to a corona discharge treatment and then melt-coated with PA12 in a layer thickness of 0.7 mm. The interlaminar bonding strength of the tube was measured. The results are shown in Table 2.

TABLE 2

| | Inner layer | Outer layer | Bonding layer | | | | | | Peeling strength (kgf/cm) | Remark |
|---|---|---|---|---|---|---|---|---|---|---|
| | | | Polyamide 12 | | ETFE | | Third component | | | |
| | | | Type | wt % | Type | wt % | Type | wt % | | |
| Example 1 | EP610[1] | 3030JU[2] | 3020B[3] | 30 | EP610[1] | 55 | T530[6] | 15 | 2.7 | Fracture of intermediate layer material |
| Example 2 | EP610[1] | 3030JU[2] | 3014JX7[4] | 15 | EP610[1] | 70 | T530[6] | 15 | 2.5 | |
| Example 3 | EP610[1] | 3030JU[2] | 3020B[3] | 20 | EP610[1] | 80 | — | 0 | 2.0 | |
| Example 4 | EP610[1] | 3030JU[2] | 3020B[3] | 20 | EP610[1] | 46.7 | T530[6] | 33.3 | 2.5 | |
| Comparative Example 1 | EP610[1] | 3030JU[2] | 3030B[5] | 70 | EP610[1] | 30 | — | 0 | 0.2 | Interfacial peeling at ETFE side |
| Comparative Example 2 | EP610[1] | 3030JU[2] | 3014JX7[4] | 7 | EP610[1] | 93 | — | 0 | 0.1 | Interfacial peeling at PA12 side |
| Comparative Example 3 | EP610[1] | 3030JU[2] | 3020B[3] | 47.4 | EP610[1] | 26.3 | T530[6] | 26.3 | 0.1 | Interfacial peeling at ETFE side |
| Comparative Example 4 | EP610[1] | 3030JU[2] | None (corona discharge treatment) | | | | | | 0.1 | Interfacial peeling |

Note)
1): Neoflon EP610 [manufactured by Daikin Industries Ltd., ethylene/tetrafluoroethylene copolymer, melting point: 225° C., viscosity: $2\times10^4$ poise (temperature: 250° C., shear rate: 100 $\sec^{-1}$)]
2): PA12-3030JU [polyamide 12 manufactured by Ube Industries, Ltd., melting point: 174° C., viscosity: $1\times10^4$ poise (temperature: 250° C., shear rate: $10^2$ $\sec^{-1}$)]
3): PA12-3020B [polyamide 12 manufactured by Ube Industries, Ltd., melting point: 176° C., viscosity: $3\times10^3$ poise (temperature: 250° C., shear rate: $10^2$ $\sec^{-1}$)]
4): PA12-3014JX7 [polyamide 12 manufactured by Ube Industries, Ltd., melting point 174° C., viscosity: $5\times10^1$ poise (temperature: 250° C., shear rate: $10^2$ $\sec^{-1}$)]
5): PA12-3030B [polyamide 12 manufactured by Ube Industries, Ltd., melting point: 174° C., viscosity: $3\times10^3$ poise (temperature: 250° C., shear rate: $10^2$ $\sec^{-1}$)]
6): Dai-el thermo T530 [fluororubber manufactured by Daikin Industries Ltd., melting point: 225° C., viscosity: $3\times10^4$ poise (temperature: 250° C., shear rate: $10^2$ $\sec^{-1}$)]

What is claimed is:

1. A thermoplastic resin laminate comprising at least three thermoplastic resin layers, wherein an intermediate layer is interposed between
a first layer comprising a thermoplastic resin A1, and
a second layer comprising a thermoplastic resin B1,
wherein said first layer and said second layer are not bonded to each other;
wherein said intermediate layer comprises a thermoplastic resin composition, wherein said thermoplastic resin composition comprises a thermoplastic resin A2 having a bonding property to the thermoplastic resin A1 and a thermoplastic resin B2 having a bonding property to the thermoplastic resin B1 and forms a dispersion structure;
wherein said dispersion structure is inverted in said intermediate layer in the vicinity of the interface between said intermediate layer and said first layer and in the vicinity of the interface between said intermediate layer and said second layer by:
the thermoplastic resin A2 forming a continuous phase and the thermoplastic resin B2 forming a dispersed phase in the intermediate layer at the vicinity of the interface between the intermediate layer and the first layer, and
the thermoplastic resin B2 forming the continuous phase and the thermoplastic resin A2 forming the dispersed phase in the intermediate layer at the vicinity of the interface between the intermediate layer and the second layer; and
wherein the thermoplastic resin A1 and the thermoplastic resin A2 are an ethylene/tetrafluoroethylene copolymer, and the thermoplastic resin B1 and the thermoplastic resin B2 are a polyamide 12.

2. The thermoplastic resin laminate according to claim 1, wherein a molar ratio of ethylene/tetrafluoroethylene in the ethylene/tetrafluoroethylene copolymer is from 10/90 to 38/62.

3. The thermoplastic resin laminate according to claim 1, wherein a weight ratio of the polyamide 12 to the ethylene/tetrafluoroethylene copolymer in the intermediate layer is from 1/9 to 3/2.

* * * * *